(12) United States Patent
Wang et al.

(10) Patent No.: US 6,520,840 B1
(45) Date of Patent: Feb. 18, 2003

(54) CMP SLURRY FOR PLANARIZING METALS

(75) Inventors: Yuchun Wang, San Jose, CA (US); Rajeev Bajaj, Fremont, CA (US); Fred C. Redeker, Fremont, CA (US)

(73) Assignee: Applied Materials, Inc., Santa Clara, CA (US)

( * ) Notice: Subject to any disclaimer, the term of this patent is extended or adjusted under 35 U.S.C. 154(b) by 54 days.

(21) Appl. No.: 09/692,723

(22) Filed: Oct. 19, 2000

Related U.S. Application Data

(63) Continuation-in-part of application No. 09/428,304, filed on Oct. 27, 1999.

(51) Int. Cl.$^7$ ................................................. B24B 1/00
(52) U.S. Cl. ........................... 451/41; 451/60; 451/446; 51/309; 106/3; 438/692; 438/693; 252/79.2
(58) Field of Search ............................ 451/60, 41, 446; 51/309; 106/3; 438/692, 693; 252/79.2

(56) References Cited

U.S. PATENT DOCUMENTS

| | | |
|---|---|---|
| 4,789,648 A * 12/1988 | Chow et al. ................. | 437/225 |
| 4,867,757 A   9/1989 | Payne | |
| 5,014,468 A   5/1991 | Ravipati et al. | |
| 5,209,816 A *  5/1993 | Yu et al. ..................... | 156/636 |
| 5,340,370 A *  8/1994 | Cadien et al. ................. | 51/308 |
| 5,453,312 A   9/1995 | Haas et al. | |
| 5,454,844 A  10/1995 | Hibbard et al. | |
| 5,692,950 A  12/1997 | Rutherford et al. | |
| 5,693,563 A  12/1997 | Teong | |
| 5,756,398 A   5/1998 | Wang et al. | |
| 5,783,489 A   7/1998 | Kaufman et al. | |
| 5,820,450 A  10/1998 | Calhoun | |
| 5,842,910 A  12/1998 | Krywanczyk et al. | |
| 5,866,031 A   2/1999 | Carpio et al. | |
| 5,932,486 A   8/1999 | Cook et al. | |
| 5,954,997 A   9/1999 | Kaufman et al. | |
| 6,008,405 A  12/1999 | Gray et al. | |
| 6,030,899 A   2/2000 | Cook et al. | |
| 6,046,110 A   4/2000 | Hirabayashi et al. | |
| 6,063,306 A   5/2000 | Kaufman et al. | |
| 6,068,879 A   5/2000 | Pasch | |
| 6,074,949 A   6/2000 | Schonauer et al. | |
| 6,083,840 A   7/2000 | Mravic et al. | |
| 6,096,652 A   8/2000 | Watts et al. | |
| 6,117,775 A   9/2000 | Small et al. | |
| 6,117,783 A   9/2000 | Small et al. | |
| 6,126,853 A  10/2000 | Kaufman et al. | |
| 6,210,525 B1   4/2001 | James et al. | |
| 6,217,416 B1   4/2001 | Kaufman et al. | |
| 6,245,679 B1   6/2001 | Cook et al. | |
| 2001/0036798 A1  11/2001 | Oliver | |

FOREIGN PATENT DOCUMENTS

| | | | |
|---|---|---|---|
| EP | 659 858 A2 | 6/1995 | |
| EP | 659 858 A3 | 1/1997 | |
| EP | 0 846 742   | 6/1998 | |
| EP | 0 846 742 A2 | 6/1998 | |
| EP | 0 846 742 A * | 10/1998 | ............ C09G/1/02 |
| EP | 0 896 042   | 2/1999 | |
| WO | WO 98/49723 | 11/1998 | |
| WO | WO 99/53532 | 10/1999 | |
| WO | WO 99/61540 | 12/1999 | |
| WO | WO 00/00561 | 1/2000 | |
| WO | Wo 00/00567 | 1/2000 | |
| WO | WO 01/12739 | 2/2001 | |

OTHER PUBLICATIONS

USSN 09/692,723 (Wang, et al.), filed Oct. 19, 2000.
European Search Report from EP 00 30 8511, Dated Oct. 02, 2001.
Austrian Search Report from 200006115–0, Dated Sep. 17, 2001.

\* cited by examiner

*Primary Examiner*—M. Rachuba
*Assistant Examiner*—Shantese McDonald
(74) *Attorney, Agent, or Firm*—Moser, Patterson & Sheridan

(57) ABSTRACT

A CMP slurry is formulated with an oxidizer capable of oxidizing a metal undergoing planarization and yielding a complexing agent which complexes with the oxidized metal thereby minimizing overetching. The slurry may further include abrasive particles, inhibitors, pH adjusting agents, and combinations thereof.

55 Claims, No Drawings

CM P SLURRY FOR PLANARIZING METALS

RELATED APPLICATIONS

This application is a continuation-in-part of co-pending U.S. patent application Ser. No. 09/428,304 [AMAT/3921], which was filed on Oct. 27, 1999, and is incorporated by reference herein.

BACKGROUND OF THE INVENTION

1. Field of the Invention

The present invention relates to a slurry for planarizing metals by chemicalmechanical polishing (CMP) with improved planarity. The present invention is applicable to manufacturing high speed integrated circuits having submicron design features and high conductivity interconnect structures with high production throughput.

2. Background of the Related Art

In the fabrication of integrated circuits and other electronic devices, multiple layers of conducting, semiconducting, and dielectric materials are deposited on or removed from a surface of a substrate. Thin layers of conducting, semiconducting, and dielectric materials may be deposited by a number of deposition techniques. Common deposition techniques in modem processing include physical vapor deposition (PVD), also known as sputtering, chemical vapor deposition (CVD), plasma-enhanced chemical vapor deposition (PECVD), and now electrochemical plating (ECP).

As layers of materials are sequentially deposited and removed, the uppermost surface of the substrate may become non-planar across its surface and require planarization. Planarizing a surface, or "polishing" a surface, is a process where material is removed from the surface of the substrate to form a generally even, planar surface. Planarization is useful in removing undesired surface topography and surface defects, such as rough surfaces, agglomerated materials, crystal lattice damage, scratches, and contaminated layers or materials. Planarization is also useful in forming features on a substrate by removing excess deposited material used to fill the features and to provide an even surface for subsequent levels of metallization and processing.

Chemical mechanical planarization, or chemical mechanical polishing (CMP), is a common technique used to planarize substrates. CMP utilizes a chemical composition, typically a slurry or other fluid medium, for selective removal of material from substrates. In conventional CMP techniques, a substrate carrier or polishing head is mounted on a carrier assembly and positioned in contact with a polishing pad in a CMP apparatus. The carrier assembly provides a controllable pressure to the substrate urging the substrate against the polishing pad. The pad is moved relative to the substrate by an external driving force. Thus, the CMP apparatus effects polishing or rubbing movement between the surface of the substrate and the polishing pad while dispersing a polishing composition, or slurry, to effect both chemical activity and mechanical activity.

Conventional CMP processes are performed using an abrasive article, such as a polishing composition, or slurry, containing abrasive particles in a reactive solution with a conventional polishing pad. Alternatively, the abrasive article can be a fixed abrasive article, such as a fixed abrasive polishing pad, which may be used with a CMP composition or slurry that does not contain abrasive particles. A fixed abrasive article typically comprises a backing sheet with a plurality of geometric abrasive composite elements adhered thereto.

The chemical compositions used in CMP typically include multiple components such as oxidizing agents and complexing agents. The compositions may further include abrasive particles, such as colloidal silica, as the abrasive component. The components are typically combined prior to the delivery of the composition to the pad for polishing. The various components may interact with one another or otherwise degrade resulting in a less effective formulation. A typical pot life, e.g., the effective period of the slurry, may be twenty four (24) hours or less under certain polishing performance requirements.

Therefore, there exists a need for a method and CMP composition that has an extended pot life and maintains an effective polishing result.

SUMMARY OF THE INVENTION

Aspects of the invention generally provide a method and composition for planarizing a substrate surface including planarizing metals, such as Cu and Cu alloys, with reduced dishing, improved surface planarity, increased throughput, and reduced manufacturing costs.

In one aspect, the invention provides a slurry for chemical mechanical polishing a metal comprising a reagent having a first moiety for oxidizing the metal and for complexing with the metal and/or oxidized metal and a second moiety for minimizing overetching the metal. The slurry may further include abrasive particles, inhibitors, pH adjusting agents, and combinations thereof.

In another aspect, the invention provides a method for planarizing a surface of a metal layer by chemical mechanical polishing the surface with a slurry comprising a reagent having a first moiety for oxidizing the metal and for complexing with the metal and/or oxidized metal and a second moiety for minimizing overetching of the metal. The slurry may further include abrasive particles, inhibitors, pH adjusting agents, and combinations thereof.

DETAILED DESCRIPTION OF THE PREFERRED EMBODIMENT

The invention generally provides a composition and method for planarizing metals, such as Cu and Cu alloys, at high production throughput while eliminating or reducing dishing, consistent with ever increasing demands for reliable interconnect patterns having feature sizes in the deep sub-micron range. In addition, aspects the invention enable effective CMP of metals at a reduced manufacturing cost and extended pot life of the composition. As used throughout this disclosure, the symbol Cu is intended to encompass high purity elemental copper as well as copper-based alloys, e.g., copper-based alloys containing at least about 80 wt. % copper.

Aspects of the invention are achieved by employing a strategically formulated slurry for CMP metals, such as Cu, with or without abrasive particles. In other words, the slurry of the present invention can be employed with fixed abrasive polishing systems. In accordance with embodiments of the present invention, a reagent is incorporated in the slurry which functions not only as an oxidizer but also complexes with the oxidized metal thereby preventing overetching and enhancing the removal rate by solubilizing the oxidized metal. Embodiments of the present invention, therefore, comprise an organic reagent which contains an oxidizing moiety and a moiety which prevents overetching of the metal. Typically, the oxidizing moiety is a hydrophilic head with a peroxide group and the tail is a hydrophobic tail.

The precise mechanism underpinning the manner on which the reagents of the present invention function is not known with certainty. However, it is believed that the reagents employed in the present invention function both as an oxidizer and, upon oxidation, generate a complexing agent. For example, it is believed that the peroxide hydrophilic head of the inventive reagent oxidizes the metal surface. The resulting by-product, e.g., an organic acid, is believed to react with Cu or the oxidized Cu ($Cu^{2+}$) to form a carboxylic acid complex.

It is believed that the dishing is significantly curtailed because the reagent molecule stops at the surface of the metal due to the hydrophobic tail. In this way, the thickness of the oxide layer is controlled and dishing reduced.

The invention offers additional advantages over conventional CMP slurries in that the single compound provides both oxidizing and complexing reagents and exhibits greater stability than hydrogen peroxide-containing formulations which exhibit a limited pot life. Moreover, the use of a single compound oxidizing-complexing reagent reduces the number of chemicals involved, as by avoiding a separate complexing agent, thereby simplifying processing and reducing material costs.

Various reagents can be employed or formulated to implement the oxidizing and complexing functions for use in a CMP slurry in accordance with embodiments of the present invention. For example, the oxidizing moiety can comprise a peroxide group, e.g., a peroxycarboxylic acid group or a peroxycarboxylate group, in which case the resulting complexing agent comprises a carboxylic acid or carboxylate. The complexing moiety can comprise an alkyl group or derivative thereof, such as a polyethylene glycol, or an aryl group, such as benzene or a derivative thereof. Thus, suitable reagents include peroxy acids such as peroxybenzoic acid, chlorobenzoic acid, peroxyacetic acid and peroxyformic acid. Other organic peroxides such as benzoyl peroxide can also be used as an oxidizing and complexing reagent. In addition, suitable reagents include polyethylene glycol peroxy acids, such as $HOOOC(CH_2CH_2O)_n COOOH$, wherein n is about 15, and can be synthesized from polyethylene glycol.

Given the present disclosure and objectives, suitable amounts of reagents and additional components can be determined and optimized in a given situation. Generally, the present invention is applicable for CMP of various metals, such as aluminum, Cu, titanium, tantalum, nitrides thereof, as well as silicon oxynitride. CMP slurries in accordance with embodiments of the present invention can typically contain about 0.005 wt. % to about 25 wt. % of the reagent, such as about 0.5 to about 5 wt. %, e.g., about 0.5 to about 2.5 wt. %. Advantageously, an inhibitor, such as 5-methyl benzotriazole or benzotriazole, can be present as in an amount of about 0.005 wt. % about 0.5 wt. %, e.g., about 0.001 to about 0.1 wt. %. Slurries employed in the present invention can contain abrasive particles, such as alumina or silica, in an amount of about 0.01 to about 30 wt. %.

In another embodiment of the present invention, a pH adjusting agent, such as a base, is introduced to increase the solubility of a reagent if necessary, as when employing a higher molecular weight aliphatic or aromatic carboxylic acid component, e.g. wherein the carboxylic acid component of the reagent contains more than about 7 carbon atoms. Examples of pH adjusting agents include ammonium hydroxide or potassium hydroxide. The amount of the pH adjusting agents, particularly a base, is adjusted such that it is present in a sufficient amount to form a salt of the reagent. For example, a base can be present in a molar ratio with respect to the reagent of about 1:1 to about 1:2. The amount of pH adjusting agent is also adjusted to provide about neutral pH. For example, a pH between about 7 and about 8 is provided by a base in one aspect of the invention.

An example of the slurry described herein comprises between about 0.01 wt. % and about 0.1 wt % of peracetic acid, between about 0.05 wt. % and about 0.3 wt % of benzotriazole, between about 5 wt % and about 20 wt % abrasives, and potassium hydroxide in a sufficient amount to provide a pH between about 7 and about 8.

Additional conventional slurry additives can be incorporated into the slurry embodiments of the present invention to achieve their known effect, e.g., to further improve or enhance the polishing rate of a barrier layer in the wafer, such as titanium, tantalum, and nitrides thereof. In embodiments of the present invention wherein an abrasive is employed, such an abrasive can include alumina, titania, zirconia, germania, silica, ceria and mixtures thereof. The abrasives can be stored and delivered separately or can be combined with the other reagents. The addition of a stabilizer to a composition containing a reagent described herein has been found to provide the extended pot life when the abrasives and the other reagents are combined.

In another aspect of the present invention, a reagent is employed that dissociates upon formulating the slurry into an oxidizer and a complexing agent, thereby advantageously reducing the number of separate chemicals required for formulating the slurry and, additionally, increasing the shelf life of the oxidizing component. Suitable reagents for dissociating into an oxidizer and a complexing agent in accordance with the embodiments of the present invention include any of various amine-peroxy acids, such as urea hydrogen peroxide. Thus, the use of a slurry containing such a reagent creates reaction chemistry in situ for metal CMP.

The amine-peroxy acid component, e.g., urea hydrogen peroxide, can be present in an amount of about 0.005 to about 25 wt. %, such as 0.5 to about 5 wt. %, e.g., about 0.5 to about 2.5 wt. %. Advantageously, a separate complexing agent can be excluded from the slurry. Thus, slurries in accordance with the embodiments of the present invention comprise an agent that dissociates into an oxidizing agent and a complexing agent and need only contain abrasive particles, as in an amount up to 30 wt. %, in situations where fixed abrasive elements are not employed, and an inhibitor, such as 5-methyl benzotriazole or benzotriazole, as in an amount of about 0.005 to about 0.5 wt. %, e.g., about 0.001 to about 0.1 wt. %.

In accordance with embodiments of the present invention, a Cu metal film is effectively planarized with no or substantially reduced dishing, thereby enabling the use of conventional photolitography to form metal features having dimensions in the deep submicron range. A typical Cu metallization or interconnect system comprises, but is not limited to, interconnects formed by damascene and comprises depositing an interlayer dielectric overlying a substrate, forming an opening, e.g., a damascene opening, in the interlayer dielectric, depositing a diffusion barrier, such as a TaN or Ta, and filling the opening with Cu. Advantageously, the opening in the interlayer dielectric can be filled by initially depositing a seedlayer and then electroplating or electroless plating the Cu layer, typically at a thickness of about 8,000 to about 18,000 Å. The damascene openings can also be filled with Cu by PVD at a temperature of about 50° C. to about 150° C. or by CVD at a temperature under about 200° C.

Conventional substrates and interdielectric layers are encompassed by the present invention. For example, the substrate can be doped Noncrystalline silicon or galliumarsenide. The interlayer dielectric can comprise any of various dielectric materials conventionally employed in the manufacture of semiconductor devices. For example, dielectric materials, such as silicon dioxide, phosphorus-doped silicon glass (PSG), boron-phosphorus-doped silicon glass (BPSG) and silicon dioxide derived from tetraethyl orthosilicate (TEOS) or silane by plasma enhanced chemical vapor deposition (PECVD) can be employed. Interlayer dielectrics in accordance with the present invention can also comprise low dielectric constant materials, including polymers, such as polymides, and carbon-containing silicon dioxide. The openings are formed in interlayer dielectrics by conventional photolithographic and etching techniques.

The present invention provides a CMP slurry for planarizing metals, such as Cu at a high removal rate, e.g., greater than 5,000 Å per minute with reduced dishing, thereby enabling an improvement in the speed of the resulting integrated circuit and yield. Embodiments of the present invention, therefore, enable manufacturing semiconductor devices having enhanced cross-sectional area of copper interconnects, thereby improving electrical performance by reducing interconnect resistance. The slurries of the present invention exhibit high selectivity of Cu to silicon dioxide, thereby rendering them particularly applicable to damascene techniques. The slurries of the present invention enable a reduction in the amount of chemicals employed in a slurry, thereby reducing manufacturing costs and simplifying processing. The slurries in accordance with embodiments of the present invention exhibit significantly greater stability than hydrogen peroxide-containing slurries which have a limited shelf life.

The invention is applicable to planarizing during various stages of semiconductor manufacturing. The present invention enjoys particular applicability in the manufacture of high density semiconductor devices with metal features in the deep submicron range.

While foregoing is directed to the preferred embodiment of the invention, other and further embodiments of the invention may be devised without departing from the basic scope thereof, and the scope thereof is determined by the claims that follow.

What is claimed is:

1. A slurry for chemical mechanical polishing a metal, the slurry consisting essentially of:
    a reagent having:
        a first moiety for oxidizing the metal and for complexing with the metal or an oxidized metal, the first moiety comprising a peroxide group selected from the group of a peroxycarboxylic acid group, a peroxycarboxylate group, or combinations thereof, the first moiety producing a complexing agent comprising a carboxylic acid or a carboxylate following an oxidation reaction;
        a second moiety for minimizing overetching the metal, wherein the second moiety comprises an alky group, an alkyl group derivative, an aryl group, an aryl group derivative, or combinations thereof;
    an inhibitor;
    abrasive particles;
    base in an amount sufficient to provide a pH of about neutral; and
    water.

2. The slurry according to claim 1, wherein the first moiety is a hydrophilic moiety and the second moiety is a hydrophobic moiety.

3. The slurry according to claim 1, wherein the metal is copper or a copper alloy.

4. The slurry according to claim 1, wherein the second moiety comprises benzene or a derivative thereof.

5. The slurry according to claim 1, wherein the base comprises sodium hydroxide or potassium hydroxide.

6. The slurry according to claim 1, comprising about 0.005 wt. % to about 25 wt. % of the reagent.

7. The slurry according to claim 1, wherein the inhibitor is benzotriazole in an amount of about 0.005 wt. % to about 0.5 wt. %.

8. The slurry according to claim 7, comprising about 0.5 to about 5 wt. % of the reagent and about 0.001 to about 0.1 wt. % of benzotriazole.

9. The slurry according to claim 1, wherein the slurry consists essentially of between about 0.01 wt. % and about 0.1 wt. % of peracetic acid, the slurry further comprising between about 0.05 wt. % and about 0.3 wt. % of benzotriazole, between about 5 wt. % and about 20 wt. % abrasives, and potassium hydroxide in a sufficient amount to provide a pH between about 7 and about 8.

10. A slurry for chemical mechanical polishing a metal, the slurry comprising a reagent having:
    a first moiety for oxidizing the metal and for complexing with the metal and/or oxidized metal; and
    a second moiety for minimizing overetching the metal, wherein the second moiety comprises a polyethylene glycol.

11. The slurry according to claim 10, wherein the first moiety is reduced to a complexing agent for the metal or oxidized metal.

12. The slurry according to claim 11, wherein the first moiety comprises a peroxide group.

13. The slurry according to claim 12, wherein the peroxide group comprises a peroxycarboxylic acid group or a peroxycarboxylate group and the resulting complexing agent comprises a carboxylic acid or a carboxylate.

14. The slurry according to claim 10, wherein the polyethylene glycol comprises about 15 repeating monomer units.

15. The slurry according to claim 14, wherein the first moiety comprises at least one peroxycarboxylic acid or peroxycarboxylate group.

16. The slurry according to claim 10, further comprising a base.

17. The slurry according to claim 16, wherein the base and the reagent have a molar ratio of the base to the reagent between about 1:1 and about 1:2.

18. The slurry according to claim 16, wherein the base provides a pH of about neutral.

19. The slurry of claim 16, wherein the base comprises sodium hydroxide or potassium hydroxide.

20. The slurry according to claim 10, further comprising an inhibitor.

21. The slurry of claim 20, wherein the inhibitor is benzotriazole in an amount of about 0.005 wt. % to about 0.5 wt. %.

22. The slurry of claim 21, comprising about 0.5 to about 5 wt. % of the reagent and about 0.001 to about 0.1 wt. % of benzotiazole.

23. The slurry of claim 16, wherein the base and the reagent have a molar ratio of the base to the reagent between about 1:1 and about 1:2.

24. The slurry of claim 16, wherein the base provides a pH of about neutral.

25. The slurry according to claim 10, further comprising abrasive particles.

26. The slurry of claim 10, wherein the metal is copper or a copper alloy and the second moiety comprises an ark group or a derivative thereof.

27. The slurry of claim 10, wherein the composition comprises between about 0.005 wt. % to about 25 wt. % of the reagent.

28. A method of planarizing a surface of a metal layer, the method comprising:
 polishing the surface with a slurry consisting essentially of:
  a reagent having:
   a first moiety for oxidizing the metal and for complexing with the metal or an oxidized metal, the first moiety comprising a peroxide group selected from the group of a peroxycarboxylic acid group, a peroxycarboxylate group, or combinations thereof, the first moiety producing a complexing agent comprising carboxylic acid or a carboxylate following an oxidation reaction; and a
   a second moiety for minimizing overetching of the metal, wherein the second moiety comprises an alkyl group, an alkyl group derivative, an aryl group, an aryl group derivative, or combinations thereof;
  an inhibitor,
  abrasive particles;
  base in an amount sufficient to provide a pH between about 7 and about 8; and
  water.

29. The method according to claim 28, wherein the metal is copper or a copper alloy.

30. The method according to claim 29, wherein the second moiety comprises benzene or a derivative thereof.

31. The method according to claim 28, wherein the base is sodium hydroxide or potassium hydroxide.

32. The method according to claim 28, wherein the reagent is present in an amount of about 0.005 wt. % to about 25 wt. %.

33. The method according to claim 28, wherein the inhibitor is benzotriazole and is present in an amount of about 0.005 wt. % to about 0.5 wt. %.

34. The method according to claim 33, wherein the slurry contains about 0.5 to about 5 wt. % of the reagent and about 0.001 to about 0.1 wt. % of the inhibitor.

35. The method according to claim 28, wherein the slurry further comprises up to about 30 wt. % of abrasive particles.

36. The method according to claim 28, wherein the slurry consists essentially of between about 0.01 wt. % and about 0.1 wt. % of peracetic acid, the slurry further comprising between about 0.05 wt. % and about 0.3 wt. % of benzotriazole, between about 5 wt. % and about 20 wt. % abrasives, and potassium hydroxide in a sufficient amount to provide a pH between about 7 and about 8.

37. A method for chemical mechanical polishing a metal, the method comprising polishing the surface with a slurry comprising:
 a reagent having:
  a first moiety for oxidizing the metal and for complexing with the metal and/or oxidized metal; and
  a second moiety for minimizing overetching the metal, wherein the second moiety comprises a polyethylene glycol.

38. The method according to claim 37, herein the first moiety is reduced to a complexing agent for the metal or oxidized metal.

39. The method according to claim 38, wherein the first moiety comprises a peroxide group.

40. The method according to claim 39, wherein the peroxide group comprises a peroxycarboxylic acid group or a peroxycarboxylate group and the resulting complexing agent comprises a carboxylic acid or a carboxylate.

41. The method according to claim 37, wherein the polyethylene glycol comprises about 15 repeating units.

42. The method according to claim 41, wherein the first moiety comprises at least one peroxycarboxylic acid or peroxycarboxylate group.

43. The method according to claim 37, wherein the metal is copper or a copper alloy.

44. The method according to claim 37, wherein the slurry further comprises a base.

45. The method according to claim 44, wherein the base and the reagent have a molar ratio of the base to the reagent between about 1:1 and about 1:2.

46. The method according to claim 44, wherein the base provides a pH of about neutral.

47. The method according to claim 37, wherein the reagent further contains an inhibitor.

48. The method of claim 29, wherein the reagent is present in an amount of about 0.005 wt. % to about 25 wt. %.

49. The method of claim 29, wherein the inhibitor is benzotriazole and is present in an amount of about 0.005 wt. % to about 0.5 wt. %.

50. The method of claim 49, wherein the slurry contains about 0.5 to about 5 wt. % of the reagent and about 0.001 to about 0.1 wt. % of the inhibitor.

51. The method of claim 37, wherein the slurry further comprises up to about 30 wt. % of abrasive particles.

52. The method of claim 37, wherein the base and the reagent have a molar ratio of the base to the reagent between about 1:1 and about 1:2.

53. The method of claim 37, wherein the base provides a pH of about neutral.

54. A slurry for chemical mechanically polishing a metal, the slurry consisting essentially of:
 between about 0.01 wt. % and about 0.1 wt. % of peracetic acid;
 between about 5 wt. % and about 20 wt. % abrasives;
 between about 0.05 wt. % and about 0.3 wt. % of benzotriazole;
 potassium hydroxide in a sufficient amount to provide a pH between about 7 and, about 8; and
 water.

55. A method of planarizing a surface of a metal layer, the method comprising chemical mechanical polishing the surface with a slurry consisting essentially of:
 between about 0.01 wt. % and about 0.1 wt. % of peracetic acid;
 between about 5 wt. % and about 20 wt. % abrasives;
 between about 0.05 wt. % and about 0.3 wt. % of benzotriazole; potassium hydroxide in a sufficient amount to provide a pH between about 7 and about 8; and
 water.

* * * * *

UNITED STATES PATENT AND TRADEMARK OFFICE
CERTIFICATE OF CORRECTION

PATENT NO.    : 6,520,840 B1
DATED         : February 18, 2003
INVENTOR(S)   : Wang et al.

It is certified that error appears in the above-identified patent and that said Letters Patent is hereby corrected as shown below:

Column 1,
Line 1, please change "CM P" to -- CMP --.
Line 11, please change "chemicalmechanical" to -- chemical-mechanical --.

Column 5,
Line 1, please change "Noncrystalline" to -- monocrystalline --.
Line 57, please change "alky" to -- alkyl --.

Column 6,
Line 25, please change "metal;and" to metal; and --.
Line 60, please change "benzotiazole" to -- benzotriazole --.

Column 7,
Line 2, please change "ark" to -- aryl --.
Line 19, please change "and a" to -- and --.
Line 63, please change "herein" to -- wherein --.

Signed and Sealed this

Second Day of September, 2003

JAMES E. ROGAN
*Director of the United States Patent and Trademark Office*